United States Patent
Park et al.

(10) Patent No.: US 10,161,477 B2
(45) Date of Patent: Dec. 25, 2018

(54) ACTUATOR AND ELECTRONIC DEVICE HAVING THE SAME

(71) Applicant: MOATECH CO., LTD., Incheon (KR)

(72) Inventors: In-Yong Park, Incheon (KR); Yun Choi, Incheon (KR); Seong-Gi Park, Incheon (KR)

(73) Assignee: MOATECH CO., LTD., Incheon (KR)

( * ) Notice: Subject to any disclaimer, the term of this patent is extended or adjusted under 35 U.S.C. 154(b) by 373 days.

(21) Appl. No.: 15/042,713

(22) Filed: Feb. 12, 2016

(65) Prior Publication Data

US 2016/0238106 A1    Aug. 18, 2016

(30) Foreign Application Priority Data

Feb. 12, 2015    (KR) .................. 10-2015-0021818

(51) Int. Cl.
| | |
|---|---|
| *F16H 57/028* | (2012.01) |
| *F16H 1/20* | (2006.01) |
| *F16H 57/039* | (2012.01) |
| F16H 57/021 | (2012.01) |

(52) U.S. Cl.
CPC ........... *F16H 1/203* (2013.01); *F16H 57/028* (2013.01); *F16H 57/039* (2013.01); *F16H 2057/0213* (2013.01)

(58) Field of Classification Search
CPC ...... F16H 1/203; F16H 57/028; F16H 57/039; F16H 2057/0213
See application file for complete search history.

(56) References Cited

U.S. PATENT DOCUMENTS

| | | | | |
|---|---|---|---|---|
| 3,242,756 A | * | 3/1966 | Fry ....................... | F16K 31/048 74/412 R |
| 4,885,948 A | * | 12/1989 | Thrasher, Jr. .......... | H02K 7/081 310/83 |
| 4,979,603 A | * | 12/1990 | Wheatland ............. | A01B 61/00 192/150 |
| 5,564,308 A | * | 10/1996 | Hoshikawa ............. | E05B 81/25 292/201 |
| 5,605,071 A | * | 2/1997 | Buchanan, Jr. ........... | F16H 1/16 188/134 |
| 6,394,220 B1 | * | 5/2002 | Kurokawa ........... | B62D 5/0409 180/444 |
| 6,867,516 B2 | * | 3/2005 | Frey ....................... | H02K 5/148 310/51 |
| 2003/0084740 A1 | * | 5/2003 | Turk ....................... | E05F 15/63 74/425 |
| 2006/0053921 A1 | * | 3/2006 | Kawamura ....... | B60R 25/02153 74/425 |
| 2006/0117889 A1 | * | 6/2006 | Segawa ................ | B62D 5/0409 74/425 |

(Continued)

FOREIGN PATENT DOCUMENTS

KR    20140098004 A    8/2014

*Primary Examiner* — David M Fenstermacher
(74) *Attorney, Agent, or Firm* — Hauptman Ham, LLP

(57) ABSTRACT

The present invention relates an actuator including a housing, a drive unit installed in the housing and provided with a rotatable shaft, a bearing part installed in the housing to rotatably support the shaft at different positions, at least one bearing part included in the bearing part being fixed to the housing, and a gear unit accommodated in the housing, the gear unit being rotated about different axes rotational power transmitted thereto from the shaft.

8 Claims, 7 Drawing Sheets

(56) References Cited

U.S. PATENT DOCUMENTS

| | | | | |
|---|---|---|---|---|
| 2006/0236802 A1* | 10/2006 | Sesita | .................... | H02K 7/106 |
| | | | | 74/425 |
| 2006/0238051 A1* | 10/2006 | Sesita | .................. | H02K 7/1166 |
| | | | | 310/90 |
| 2006/0243078 A1* | 11/2006 | Sesita | .................... | F16C 25/08 |
| | | | | 74/425 |
| 2007/0137354 A1* | 6/2007 | Botalenko | ............... | F16D 65/60 |
| | | | | 74/425 |
| 2016/0084347 A1* | 3/2016 | Qi | ......................... | H02K 5/225 |
| | | | | 74/425 |
| 2016/0091052 A1* | 3/2016 | Park | ....................... | F16H 55/06 |
| | | | | 74/425 |

* cited by examiner

ACTUATOR AND ELECTRONIC DEVICE HAVING THE SAME

CROSS REFERENCE TO RELATED APPLICATION

This application claims the benefit of Korean Patent Application No. 10-2015-0021818, filed on Feb. 12, 2015, entitled "ACTUATOR AND ELECTRONIC DEVICE HAVING THE SAME", which is hereby incorporated by reference in its entirety into this application.

BACKGROUND

1. Technical Field

The present invention relates to an actuator and an electric device having the same, and more particularly, to an actuator capable reducing an error in operation angle and electronic devices with the same.

2. Description of the Related Art

In general, various kinds of vehicles including cars and trucks are provided with headlamps and thus can secure safe driving by turning on the lights at night or when the weather is bad.

A headlamp is conventionally provided with a high beam lamp and a low beam lamp separately. Accordingly, a vehicle is provided with a vertical leveling actuator which is capable of turning on the low beam lamp for driving when the weather is normal and turning on the high beam lamp when the front view is unusually bad, and a swivel actuator capable of adjusting the horizontal position of the headlamp.

In using the swivel actuator, horizontal rotational positions of a headlamp for vehicles are set, and are controlled by a separate actuator.

In addition, a lamp assembly is connected to a shaft rotatably provided to the actuator, and the rotational position thereof is determined in operative connection with rotation of the shaft.

Herein, the rotation of power of the shaft is transmitted to multiple gears which are engaged with each other.

The shaft serving as a rotational axle of a motor is supported by bearings along three axes. Thereby, load to the shaft increases, lowering output torque.

In addition, when the shaft rotates, the shaft may be bent or the rear end thereof may be displaced from the center of rotation. In this case, the rotational power is unstably transmitted to the gears, thereby resulting in an error in operation angle of a corresponding operational mechanism.

As a prior art document related to the present invention, Korean Patent Publication Application No. 10-2014-0098004 (Pub. Date: Aug. 7, 2014) has been published.

BRIEF SUMMARY

In view of the above, an object of the present invention is to provide an actuator capable of eliminating load to a shaft by minimizing friction against a sleeve bearing provided to a drive unit to guide rotation of the shaft and preventing the shaft from being bent by rotatably supporting the shaft at the front end and the rear end of the shaft coupled to a worm gear through bearings to minimize clearance between gears engaging in rotation of the shaft and to thereby increase accuracy of the operation angle of a headlamp, and an electronic device having the same.

Another object of the present invention is to provide an actuator capable of efficiently preventing vibration of the shaft during rotation of the shaft by fixedly accommodating bearings adapted to rotatably supporting the shaft, using a portion of a housing, and an electronic device having the same.

It is an aspect of the present invention to provide an actuator including a housing, a drive unit installed in the housing and provided with a rotatable shaft, a bearing part installed in the housing to rotatably support the shaft at different positions, at least one bearing part included in the bearing part being fixed to the housing, and a gear unit accommodated in the housing, the gear unit being rotated about different axes rotational power transmitted thereto from the shaft.

Preferably, the drive unit is provided with a sleeve bearing, an end of the shaft passing through the sleeve bearing.

Preferably, an inner diameter of the sleeve bearing is greater than an outer diameter of the shaft.

Preferably, the bearing part comprises first and second ball bearings for rotatably supporting the shaft at different positions.

Preferably, the housing is provided with a bearing accommodation part for accommodating the second ball bearing.

Preferably, the bearing accommodation part is provided with a bearing cover for covering an upper portion of the second ball bearing.

Preferably, the bearing cover is fixed to the bearing accommodation part through a fastening member.

Preferably, the bearing cover is formed in a shape corresponding to a shape of an upper end of the second ball bearing, and closely contacts the upper end of the bearing.

Preferably, the gear unit includes a first gear connected to the shaft and adapted to rotate about a first axis, a second gear engaged with the first gear and adapted to rotate about a second axis perpendicular to the first axis, and a third gear adapted to rotate in operative connection with the second gear.

Herein, it is preferable that the first ball bearing rotatably supports the shaft on a front end side of the first gear, and the second bearing rotatably supports the shaft on a rear end side of the first gear. Preferably, the second gear is a multi-step gear formed stepwise.

Preferably, the third gear is provided with a magnet or delivering a rotational position thereof to a sensor.

It is in another aspect of the present invention to provide an electronic device including the actuator described above.

Load to a shaft may be eliminated by minimizing friction against a sleeve bearing provided to a drive unit to guide rotation of the shaft and the shaft may be prevented from being bent as the shaft is rotatably supported at the front end thereof coupled to a worm gear and the rear end thereof through bearings to reduce clearance between gears engaging in rotation of the shaft. Thereby, accuracy of the operation angle of a headlamp may be enhanced.

In addition, as bearings rotatably supporting the shaft are fixedly accommodated using a portion of the housing, rocking of the shaft may be efficiently prevented during rotation of the shaft.

DETAILED DESCRIPTION

Hereinafter, an actuator and an electric device and having the same according to embodiments of the present invention will be described in detail with reference to the accompanying drawings.

Figure 1:
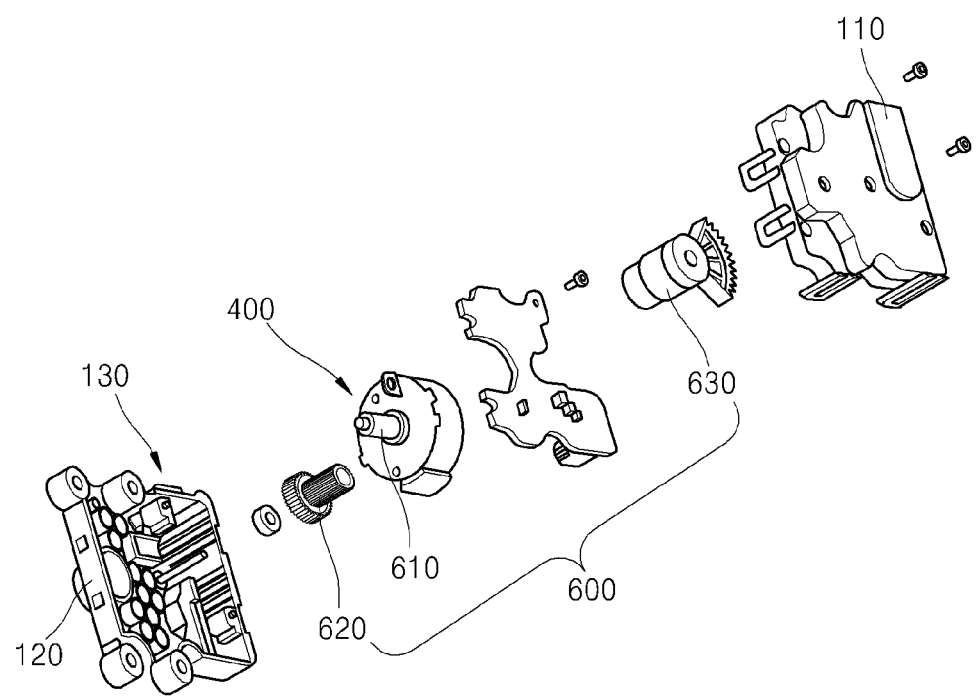
FIG. 1 is an exploded perspective view illustrating an actuator according to an embodiment of the present invention.
Figure 2:
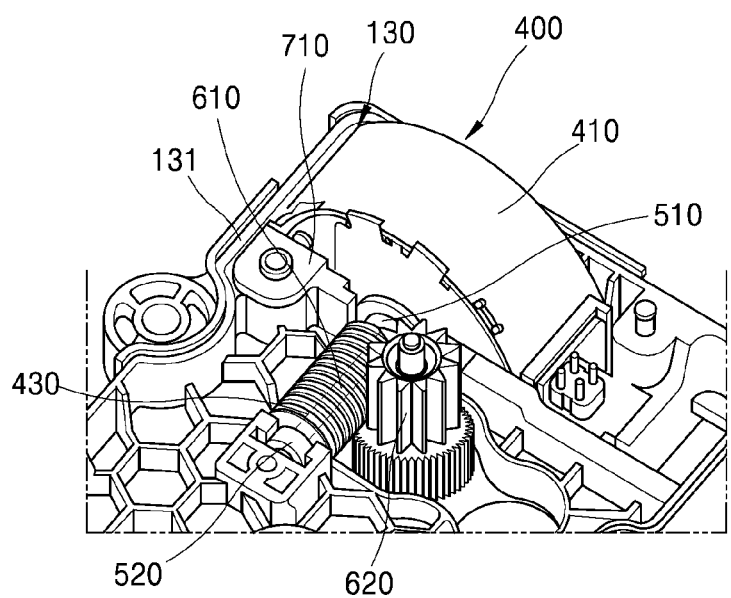
FIG. 2 is a perspective view illustrating an assembly of an actuator according to an embodiment of the present invention.
Figure 3:
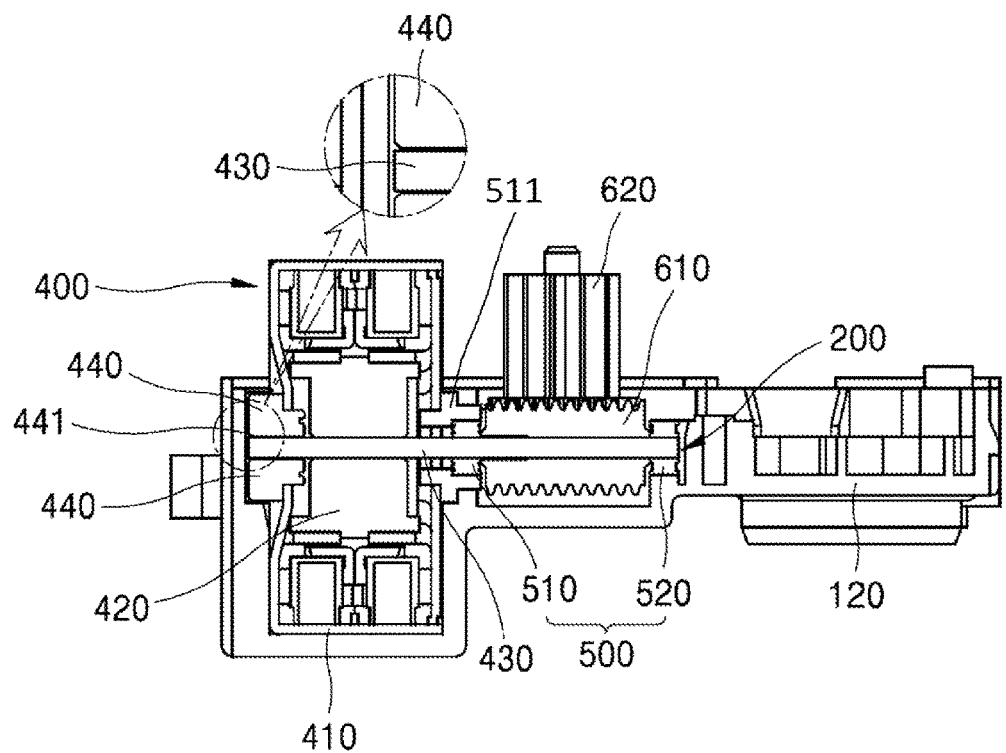
FIG. 3 is a cross-sectional view illustrating an actuator according to an embodiment of the present invention.
Figure 4:
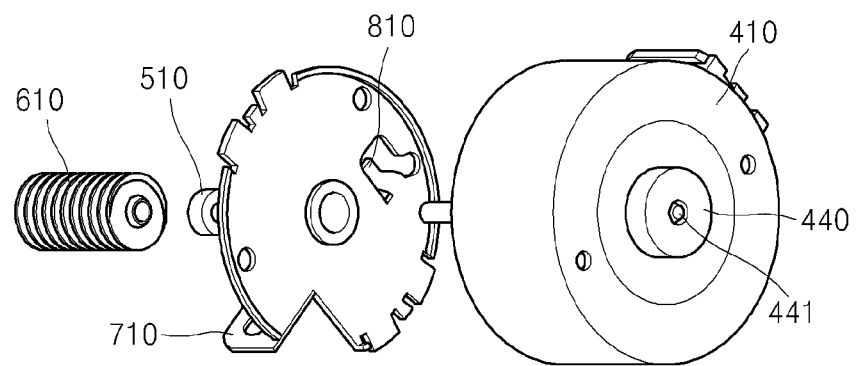
FIG. 4 is an exploded perspective view illustrating a drive unit having a sleeve bearing according to an embodiment of the present invention.

FIG. 1 is an exploded perspective view illustrating an actuator according to an embodiment of the present invention, and FIG. 2 is a perspective view illustrating an assembly of an actuator according to an embodiment of the present invention. FIG. 3 is a cross-sectional view illustrating an actuator according to an embodiment of the present invention, and FIG. 4 is an exploded perspective view illustrating a drive unit having a sleeve bearing according to an embodiment of the present invention.

Referring to FIGS. 1 to 3, an electronic device according to an embodiment of the present invention includes an actuator for rotating a headlamp.

The actuator includes a housing 100, a drive unit 400, a bearing part 500, and a gear unit 600.

The housing 100 includes an upper housing 110 and a lower housing 120, which are coupled to each other.

The lower housing 120 is provided with a seating part 130 in which the drive unit 400 is seated.

The drive unit 400 includes a case 410 and a case cover 411 coupled to one side of the case 410.

The drive unit 400 is provided with a motor 420 having a shaft 430 rotatably connected to the center thereof.

Referring to FIG. 4, the shaft 430 is disposed to protrude along a first axis through the center of one side of the case cover 411.

A sleeve bearing 440 for rotatably supporting an end of the shaft 430 is installed at a lower end of the motor 420.

The end of the shaft 430 passes through a guide hole 441 of the sleeve bearing 440.

Herein, the inner diameter of the guide hole 441 of the sleeve bearing 440 is greater than the outer diameter of the shaft 430.

Accordingly, a certain gap is maintained between the outer circumference of the end of the shaft 430 and the inner circumference of the guide hole 441 of the sleeve bearing 440. That is, the end of the shaft 430 may not physically contact the inner circumference of the guide hole 441.

Thereby, load applied to the end of the shaft 430 by friction against the sleeve bearing 440 may be reduced.

Referring to FIG. 3, the shaft 430 protruding from one side of the case cover 411 is rotated by the bearing part 500.

The bearing part 500 includes a plurality of bearing parts disposed in the lower housing 120 to rotatably support multiple positions on the shaft 430.

Preferably, the bearing part 500 may include a first ball bearing 510 and a second ball bearing 520.

The first ball bearing 510 is installed in the lower housing 120 to rotatably support the shaft 430 on the front end side of a first gear 610.

That is, a bush 511 is installed on one side of the case cover 411 from which the shaft 430 protrudes, and the first ball bearing 510 is press-fitted into the bush 511.

Accordingly, the first ball bearing 510 rotatably supports the shaft 430 on the front end side of the first gear 610, which is a worm gear.

The second ball bearing 520 is installed in the lower housing 120 to rotatably support the shaft 430 on the rear end side of the first gear 610.

That is, the second ball bearing 520 is installed in a bearing accommodation part 200 formed in the lower housing 120 to rotatably support the shaft 430 at the rear end of the first gear 610, which is a worm gear.

In this embodiment, the first and second ball bearings 510 and 520 are used to rotatably support the front end and rear end of the shaft 430 coupled to the first gear 610 which is a worm gear. Thereby, the shaft 430 may be prevented from being bent while the shaft 430 is driven to rotate.

The lower housing 120 is provided with the bearing accommodation part 200.

The bearing accommodation part 200 is formed in the shape of a groove for accommodating the second ball bearing 520 which rotatably supports the rear end of the shaft 430 coupled to the first gear 610.

Herein, the second ball bearing 520 accommodated in the bearing accommodation part 200 is preferably disposed to closely contact the inner wall and bottom of the bearing accommodation part 200 which form a groove shape.

Accordingly, the position of the second ball bearing 520 accommodated in the bearing accommodation part 200 may not be affected by vibration according to rotation of the shaft 430.

Figure 5:
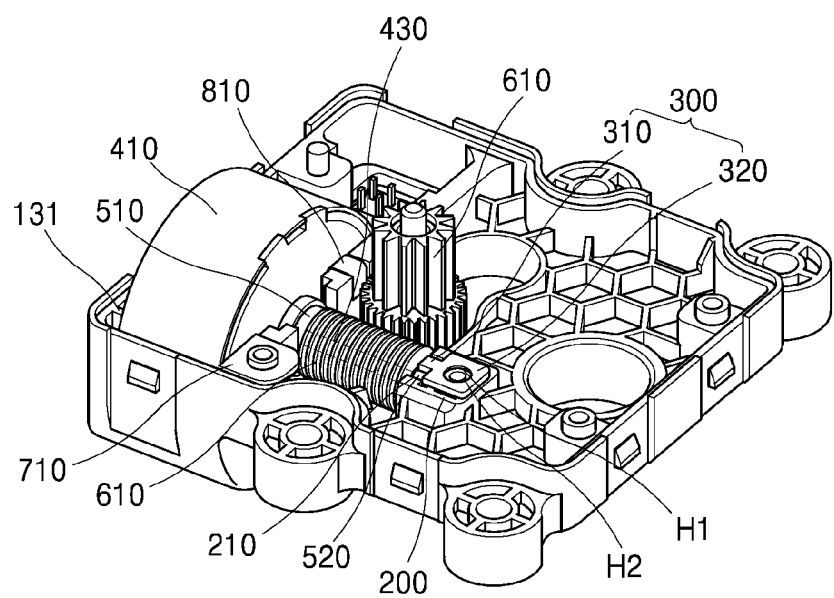
FIG. 5 is a perspective view illustrating installation of a bearing cover at a bearing accommodation part.
Figure 6:
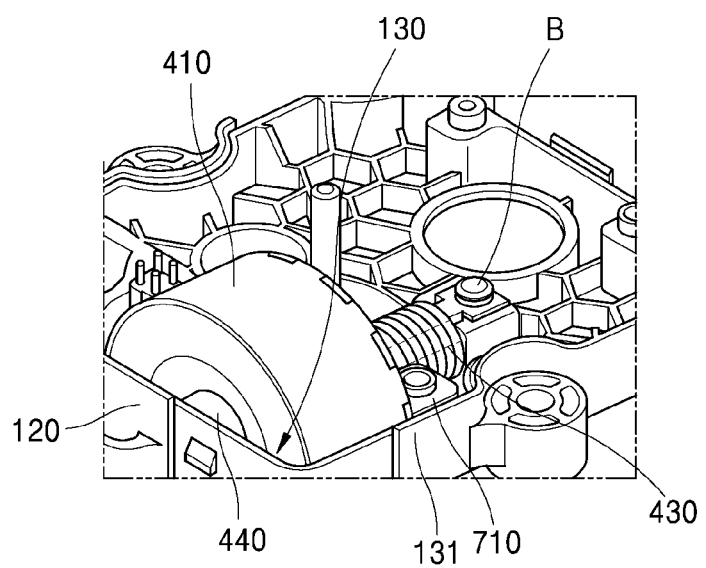
FIG. 6 is a perspective view illustrating the bearing cover fixed to the bearing accommodation part through a fastening member.
Figure 7:
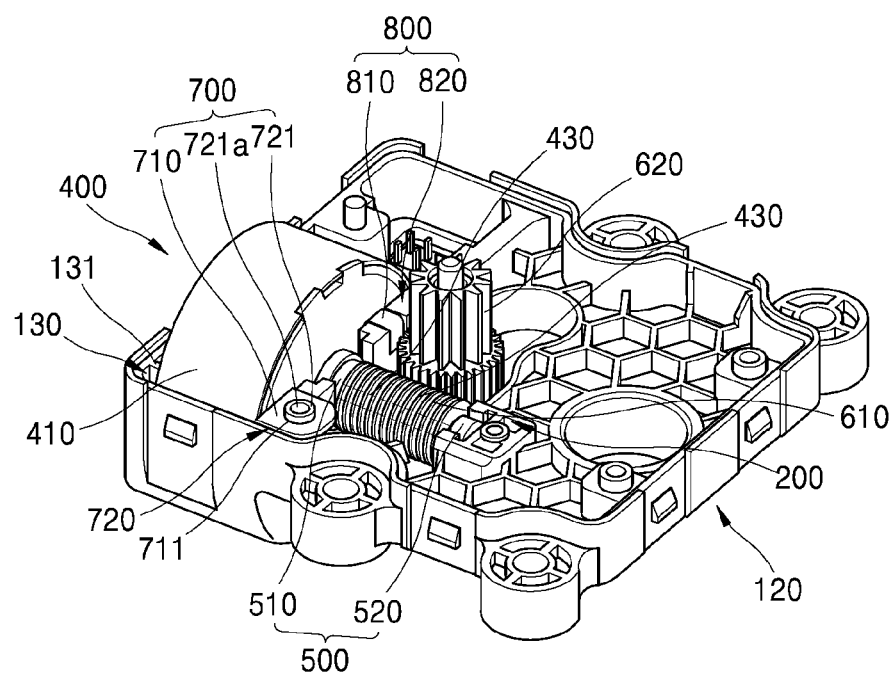
FIG. 7 is a view illustrating an example of a bearing cover according to an embodiment of the present invention.

FIG. 5 is a perspective view illustrating installation of a bearing cover at a bearing accommodation part, and FIG. 6 is a perspective view illustrating the bearing cover fixed to the bearing accommodation part through a fastening member.

Referring to FIGS. 5 and 6, a bearing cover 300 may be installed at an upper end of the bearing accommodation part 200.

The bearing cover 300 may be formed by a metal fragment, and provided with a second fastening hole H2 at the center thereof.

The bearing accommodation part 200 includes an accommodation groove 210 for accommodating the second ball bearing 520, and a fastening part 220 formed near the accommodation groove 210 and provided with a first fastening hole H1 formed in a vertical direction.

In addition, the bearing cover 300 includes a cover fragment 310 for covering the accommodation groove 210 and a fixation fragment 320 which is connected to the cover fragment 310, disposed at the upper end of the fastening part 220 and provided with the second fastening hole H2 at the center thereof.

Accordingly, the cover fragment 310 is a member that substantially covers the upper end of the second ball bearing 520.

In addition, a fastening member B is screw-coupled to the first and second fastening holes H1 and H2. Thereby, the bearing cover 300 may be fixed to the upper end of the bearing accommodation part 200.

According to the configuration described above, the second ball bearing 520 is fixed by being accommodated in the bearing accommodation part 200, and the upper end thereof is covered by the bearing cover 300. Thereby, the rear end of the shaft 430 coupled to the first gear 610 which is a worm gear maybe prevented from being deformed or being displaced outward from the position thereof along the first axis.

Therefore, physically covering the second ball bearing 520 with the bearing cover 300 of the present invention may be important.

Although not shown in the figure, a cover fragment according to an embodiment of the present invention may be formed in the shape of a flat plate, or may be formed in the convex shape having a curvature to closely contact the upper end of the second ball bearing 520.

Accordingly, the upper end of the second ball bearing 520 forming a curve may be fixed by being closely contacting the cover fragment having a curvature, and horizontal and vertical movement of the second ball bearing 520 may be prevented.

In addition, the fastening part 220 of the bearing accommodation part 200 may be provided with a plurality of fastening grooves (not shown).

In this case, it is better for the lower end of the fixation fragment 320 to be provided with fixation protrusions (not shown) which can be fixed by being fitted into the fastening grooves.

Accordingly, in the case where the bearing cover 300 is fixed to the upper end of the bearing accommodation part 200, the fixation protrusions formed at the lower end of the fixation fragment 320 may be primarily fixed by being fitted into the multiple fastening holes formed in the fastening part 220.

Subsequently, as the fastening member B is screw-coupled to the first and second fastening holes H1 and H2, the fixation fragment 320 is secondarily fixed. Thereby, the cover fragment 310 may also be efficiently fixed by closely contacting the upper end of the second ball bearing 520.

Accordingly, by preventing movement of the second ball bearing 520 which rotatably supports the rear end of the shaft 430 coupled to the first gear 610 which is a worm gear, the shaft 430 may be prevented from being bent, and also be prevented from being displaced from the first axis during rotation thereof. Thereby, errors in operation angle for rotating the headlamp (not shown) through the gear unit 600 may be efficiently reduced.

Referring to FIGS. 1 to 3, the gear unit 600 is rotated in operative connection with the shaft 430 by rotational power delivered thereto from the shaft 430 when the shaft 430 rotates. Thereby, the headlamp is rotated.

The gear unit 600 includes a first gear 610, a second gear 620 and a third gear 630.

The first gear 610 is directly connected to the shaft 430 as a worm gear. Accordingly, the first gear 610 rotates about the first axis.

The second gear 620 is rotatably installed in the lower housing 120 so as to be engaged with the first gear 610.

The second gear 620 is disposed in the lower housing 120 in the vertical direction. That is, the second gear 620 rotates about a second axis which is perpendicular to the first axis.

Herein, the second gear 620 includes a multi-step gear formed stepwise.

In addition, the third gear 630 is engaged with an upper end of the second gear 620 and is installed to rotate about the second axis.

The third gear 630 may be provided with a magnet (not shown) for delivering the rotational position thereof to a sensor (not shown).

According to the configuration and operation described above, as a guide hole of the sleeve bearing rotatably supporting an end of the shaft on the side of the drive unit is fabricated to have an inner diameter which is greater than the outer diameter of the shaft, load to the motor may be eliminated.

Thereby, axial correction of the shaft maybe practiced along the first axis, a torque output through the gear unit may be prevented from being lowered. Thereby, errors in operation angle may be reduced.

In addition, according to an embodiment of the present invention, as the front end and the rear end of the shaft coupled to a worm gear on the first axis are rotatably supported through ball bearings, the shaft may be prevented from being bent even if the shaft rotates for a long time. Thereby, occurrence of clearance between gears may be attenuated and accuracy of the operation angle may be enhanced.

Further, according to an embodiment of the present invention, as the second ball bearing rotatably supporting the rear end of the shaft coupled to the worm gear is fixedly accommodated the in the bearing a combination party separately provided in the lower housing and physically covered by a bearing cover, axial displacement of the shaft coupled to the worm gear including deformation of the rear end of the shaft may be prevented.

Moreover, according to an embodiment of the present invention, the first gear and the second gear are arranged along different axial lines. Thereby, when rotational force is applied to the third gear which is a power output side without power applied, a self-lock function of preventing reverse rotation of the gears may be implemented by increasing frictional force through engagement of the first and second gears arranged along different axes with the third gear which is coaxially disposed with the second gear.

That is, when rotational force is applied to the opposite side, displacement of the output side caused by disengagement of the gears may be prevented.

Referring to FIG. 2, the actuator according to an embodiment of the present invention may further include a displacement prevention unit 700 and a vibration prevention unit 800.

The displacement prevention unit 700 includes a contact part 710, a seating end 720, and a fixation member 730.

The seating end 720 is formed at the upper end of a partition wall 131 defining the seating part 130.

A coupling shaft 721 is formed at the upper end of the seating end 720 and provided with a second coupling hole 721*a*.

The contact part 710 is integrally formed on one surface of the case cover 441 of the drive unit 400 in a curving or bending manner and provided with a first coupling hole 711.

The first coupling hole 711 may be fitted onto the coupling shaft 721.

Subsequently, a contact hole (not shown) formed at a corner of a circuit board (not shown) may be fitted onto the coupling shaft 721.

Then, the fixation member 730 is coupled to the second coupling hole 721*a*. Thereby, the seating end 720 fixes the contact part 710 and the circuit board.

Thereby, the drive unit 400 may be fixed while being seated on the seating part 130.

In addition, as the contact hole of the circuit board contacts the contact part 710, the contact part 710 serves as a ground of the circuit board.

Meanwhile, the vibration prevention unit 800 includes a restriction member 810 and a restriction step portion 820.

The restriction member 810 is also formed to bend and protrude from one side of the case cover 411 of the drive unit 400 and is it has a shape of ⊓.

The restriction step portion 820 is formed at the upper end of the partition wall 131 defining the seating part 130 to catch the restriction member 810.

Thereby, as the restriction member 810 is caught by the restriction step portion 820, horizontal vibration of the drive unit 400 may be prevented.

According to the configuration of the embodiment described above, as the contact part and the restriction member which are integrally formed on the drive unit are fixed to the lower housing, external shock applied to the drive unit during operation of the drive unit may be prevented from displacing the drive unit from the seating part or shaking the drive unit.

Description has been given above of specific embodiments of an actuator and an electronic device having the same. Those skilled in the art will appreciate that various modifications, additions and substitutions are possible, without departing from the scope and spirit of the invention.

Therefore the scope of the present invention should be defined by the scope of the appended claims and their equivalents, rather than being confined to the embodiments described above.

That is, the embodiments described above should be construed in all aspects as illustrative and not restrictive. The scope of protection sought by the present invention should be determined by the appended claims and their equivalents, and all changes coming within the meaning and equivalency range of the appended claims are intended to be embraced therein.

What is claimed is:

1. An actuator comprising:
    a housing;
    a drive unit installed in the housing;
    a gear unit accommodated in the housing, the gear unit being rotated by rotational power transmitted thereto from a shaft;
    a first ball bearing; and
    a second ball bearing;
    wherein the drive unit comprises a case and a case cover coupled to one side of the case and a motor,
    wherein the motor comprises the shaft to be rotated,
    wherein the first ball bearing rotatably supports a front end of a worm gear,
    wherein the worm gear is directly connected to the shaft,
    wherein the second ball bearing rotatably supports a rear end of the worm gear,
    wherein the first ball bearing is press-fitted into a bush,
    wherein the bush is installed on one side of the case cover,
    wherein the second ball bearing accommodated in a bearing accommodation part,
    wherein the bush is formed in a two-step shape,
    wherein one end of the bush is press-fitted into the case cover to support the motor,
    wherein an other end of the bush protrudes out of the case cover to support the first ball bearing.

2. The actuator according to claim 1, wherein the drive unit is provided with a sleeve bearing, an end of the shaft passing through the sleeve bearing,
    wherein an inner diameter of the sleeve bearing is greater than an outer diameter of the shaft.

3. The actuator according to claim 1, wherein the bearing accommodation part is provided with a bearing cover for covering an upper portion of the second ball bearing.

4. The actuator according to claim 3, wherein the bearing cover is fixed to the bearing accommodation part through a fastening member.

5. The actuator according to claim 3, wherein the bearing cover is formed in a shape corresponding to a shape of an upper end of the second ball bearing, and closely contacts the upper portion of the bearing.

6. The actuator according to claim 1, wherein the gear unit comprises:
    a first gear connected to the shaft and adapted to rotate about a first axis;
    a second gear engaged with the first gear and adapted to rotate about a second axis perpendicular to the first axis; and
    a third gear adapted to rotate in operative connection with the second gear,
    wherein the first ball bearing rotatably supports the shaft on a front end of the first gear,
    wherein the second bearing rotatably supports the shaft on a rear end of the first gear,
    wherein the first gear includes the worm gear.

7. The actuator according to claim 6, wherein the second gear is a multi-step gear formed stepwise.

8. An electronic device comprising the actuator according to claim 1.

* * * * *